United States Patent Office 3,322,618
Patented May 30, 1967

3,322,618
FUNGICIDAL COMPOSITIONS AND METHODS
Harold M. Taylor, Indianapolis, Ind., assignor to Eli Lilly and Company, Indianapolis, Ind., a corporation of Indiana
No Drawing. Filed Apr. 16, 1963, Ser. No. 273,282
11 Claims. (Cl. 167—30)

This invention relates to novel fungicidal compositions and to fungicidal processes employing these compositions. More especially, this invention concerns novel fungicidal compositions in which a substituted aminoalkyl ester of a halogen-substituted benzoic acid is the fungicidally active ingredient.

The compounds of the present invention have been found useful in controlling both fungi which attack food crops and fungi which damage ornamental plants.

The susceptible fungi which attack food crops include *Phytophthora infestans*, the causative organism of tomato and potato late blight; *Uromyces phaseoli*, the causative organism of bean rust; *Colletotrichum lagenarium*, the causative organism of cucumber anthracnose; *Erysiphe polygoni*, the causative organism of bean powdery mildew; *Venturia inaequalis*, the causative organism of apple scab; and *Erysiphe cichoracearum*, the causative organism of cantaloupe powdery mildew.

The susceptible fungi which affect ornamental plants include *Sphaerotheca pannosa* var. *rosae*, the causative organism of powdery mildew of rose; *Microsphaera alni* var. *vaccinii*, the causative organism of powdery mildew of catalpa; *Erysiphe cichoracearum*, the causative organism of zinnia powdery mildew; *Cercospora zinniae*, the causative organism of Cercospora leafspot of zinnia; and *Microsphaera alni*, the causative organism of powdery mildew of lilac.

It is an object of this invention to provide compositions which are toxic to certain fungi affecting food crops and ornamental plants. A further object is to provide novel compositions and processes which serve to control such fungi.

In fulfillment of the above and other objects, this invention provides a novel process which comprises applying to plant foliage a fungicidal amount of one or more alkylaminoalkyl esters of a halogen-substituted benzoic acid of the class represented by the following formula:

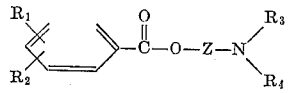

wherein $R_1$ and $R_2$ are halogen; $R_3$ and $R_4$, when taken separately, are $C_1$–$C_8$ alkyl or $C_1$–$C_4$ alkenyl; $R_3$ and $R_4$, when taken together with the nitrogen atom to which they are attached, represent morpholino, $C_4$–$C_5$ polymethyleneimino, or lower-alkyl substituted $C_4$–$C_5$ polymethyleneimino; and Z is $C_2$–$C_{20}$ saturated alkylene, $C_2$–$C_{10}$ unsaturated alkylene, $C_2$–$C_{10}$ oxaalkylene, or $C_2$–$C_{10}$ thiaalkylene. Also included within the scope of this invention are the acid addition salts of the bases represented by the above formula.

Halogen in the above formula can be fluorine, bromine, chlorine, iodine, or astatine.

The alkyl radicals in the above formula can be illustratively methyl, ethyl, n-propyl, isopropyl, n-butyl, sec.-butyl, iso-butyl, n-amyl, iso-amyl, sec.-amyl, n-hexyl, sec.-hexyl, iso-hexyl, n-heptyl, iso-heptyl, sec.-heptyl, n-octyl, iso-octyl, sec.-octyl, and the like. The alkenyl groups can be illustratively vinyl, 1-propenyl, 2-propenyl, 2-methyl-2-propenyl, 1-butenyl, 2-butenyl, 2-methyl-2-butenyl, 3-butenyl, and the like.

The polymethyleneimino radical can be illustratively 1-pyrrolidyl, 2-methyl-1-pyrrolidyl, 3-methyl-1-pyrrolidyl, 2,3-dimethyl-1-pyrrolidyl, 2,4-dimethyl-1-pyrrolidyl, 2,5-dimethyl-1-pyrrolidyl, 3,4-dimethyl-1-pyrrolidyl, 1-piperidyl, 2-methyl-1-piperidyl, 3-methyl-1-piperidyl, 4-methyl-1-piperidyl, 2,2-dimethyl-1-piperidyl, 2,6-dimethyl-1-piperidyl, 2,2,4,6-tetramethyl-1-piperidyl, and the like.

The alkylene radicals represented by Z in the generic formula can be illustratively 1,2-ethylene,
trimethylene,
tetramethylene,
pentamethylene,
hexamethylene,
heptamethylene,
octamethylene,
1-methylethylene,
1-methyl-1,3-propylene,
2-methyl-1,3-propylene,
1-methyl-1,4-butylene,
1-methyl-1,5-pentylene,
3-methyl-1,5-pentylene,
1-methyl-1,6-hexylene,
1-methyl-1,7-heptylene,
1-methyl-1,8-octylene,
1-methyl-1,9-nonylene, and the like.

Unsaturated alkylene radicals can be illustratively the divalent radicals derivable from the following unsaturated aliphatic hydrocarbons by removal of one hydrogen atom from each of two carbon atoms: 2-propene, 2-butyne, 2-butene, 1-methyl-2-pentene, 1-methyl-3-pentene, 2-methyl-3-hexene, 2-methyl-4-heptene, 3-methyl-4-octene, 1-methyl-4-octene, 4-nonene, 5-decene, and the like.

"Oxaalkylene" and "thiaalkylene" radicals refer to alkylene radicals in which a carbon atom of the designated carbon chain is replaced with an oxygen atom or a sulfur atom, respectively, as for example, 3-oxapentamethylene ($-CH_2CH_2-O-CH_2CH_2-$), 3 - thiapentamethylene ($-CH_2CH_2-S-CH_2CH_2-$), and the like.

Acid addition salts of the bases represented by the above formula can be prepared by employing for example the following acids: hydrochloric, hydrobromic, sulfuric, phosphoric, nitric, oxalic, tartaric, maleic, benodic, succinic, and the like.

As examples of compounds which have the desired fungicidal activity and which can be successfully employed as fungicides in accordance with the process of this invention, there may be mentioned β-diethylaminopropyl 3,4-dichlorobenzoate,
α-methyl-δ-diethylaminobutyl 3,4-dichlorobenzoate,
β-(di-n-butylamino)propyl 3,4-dichlorobenzoate,
γ-(2,2,4,6-tetramethylpiperidino)propyl 3,4-dichlorobenzoate,
γ-(2,6-dimethylpiperidino)-propyl 3,4-dichlorobenzoate,
2-morpholinoethyl 2,5-dichlorobenzoate,
γ-morpholinopropyl 3,4-dichlorobenzoate,
γ-(4-methylpiperidino)propyl 3,4-dichlorobenzoate,
γ-(3-methylpiperidino)propyl 3,4-dichlorobenzoate,
ω-(2-methylpiperidino)-n-hexyl 3,4-dichlorobenzoate,
β-[β-(2-methylpiperidino)ethoxy]ethyl 3,4-dichlorobenzoate,
β-[β-(2-methylpiperidino)ethylmercapto]ethyl 3,4-dichlorobenzoate,
γ-(2-methylpiperidino)propyl 3,5-dichlorobenzoate,
γ-piperidinopropyl 3,4-dichlorobenzoate,
2-morpholinoethyl 3,4-dichlorobenzoate,
β-dimethylaminoethyl 3,4-dichlorobenzoate,
γ-diethylaminopropyl 3,4-dichlorobenzoate,
γ-(di-n-butylamino)propyl 3,4-dichlorobenzoate, γ-morpholinopropyl 3,4-dichlorobenzoate,
γ-(2-methylpiperidino)propyl 3,4-dichlorobenzoate,
γ-(diallylamino)propyl 3,4-dichlorobenzoate,
γ-(2-methylpiperidino)propyl 3-iodo-4-fluorobenzoate hydrochloride,
γ-(2-methylpiperidino)propyl 2,4-dichlorobenzoate,
4-(2-methylpiperidino)-2-butynyl 3,4-dichlorobenzoate,
γ-(2-methylpiperidino)propyl 2,6-dichlorobenzoate,
γ-(2-methylpiperidino)propyl 2,5-dichlorobenzoate,
γ-morpholinopropyl 2,5-dichlorobenzoate,
4-(2-methylpiperidino)-2-butenyl 3,4-dichlorobenzoate,
γ-(2-methylpiperidino)propyl 3,4-dichlorobenzoate hydrochloride,
ω-(2-methylpiperidino)-n-pentyl 3,4-dichlorobenzoate,
and ω-(2-methylpiperidino)-n-decyl 3,4-dichlorobenzoate.

In carrying out the method of the present invention, compositions containing the active ingredient are applied to the infected or susceptible plant surfaces. A convenient and preferred method is to spray the plant surfaces with a liquid dispersion or emulsion of the toxicant.

The compositions of the present invention desirably contain in addition to the benzoate ester toxicant one or more of a plurality of additaments including water, hydroxylated carriers, petroleum distillates, and other dispersion media, surface-active dispersing agents, emulsifiers, and finely divided inert solids. The concentration of the benzoate ester compound in these compositions may vary depending on whether the composition is intended for direct application to plants or is designed as a concentrate. Those containing relatively high concentrations of the toxicant may be considered as concentrates and be subsequently diluted with additional inert carrier to produce the ultimate treating composition.

The compounds of the present invention are applied to plants in effective amounts, varying somewhat with the severity of the fungus infection and with other factors such as the environment in which treatment is conducted. In general, it will be found that an aqueous spray containing from about ⅛ to about 1 lb. of active material per 100 gallons of water is satisfactory when treatment is to be carried out in the greenhouse.

As is well understood in the art, a somewhat higher concentration of the fungicide is desirable when treatment is to be carried out in the field. In that case, the preferred range is from about ½ to about 2 lbs. of active ingredient in 100 gallons.

Treating compositions are most conveniently formulated by preparing liquid or solid concentrate compositions which are subsequently diluted to produce a composition of the desired concentration. Emulsifiable liquid concentrates may be prepared by incorporating from about 5 to about 40 percent of the active ingredient and an emulsifying agent in a suitable water-immiscible organic liquid. Such concentrates may be further diluted with water to form spray mixtures in the form of oil-in-water emulsions. Such spray compositions then comprise active toxicant, water-immiscible solvent, emulsifying agent, and water. Emulsifying agents are preferably blends of the non-ionic and ionic types and include condensation products of alkylene oxides with phenols and organic acids, polyoxyethylene derivatives of sorbitan esters, complex ether-alcohols, ionics of the aralkyl sulfonate type, and the like. Suitable organic liquids to be employed include aromatic hydrocarbons, aliphatic hydrocarbons, cycloaliphatic hydrocarbons, and mixtures thereof such as petroleum distillates.

Solid concentrate mixtures may be prepared by incorporating from about 5 to about 75 percent of the benzoate ester compound in finely divided solid carriers such as bentonite, Fuller's earth, diatomaceous earth, hydrated silica, diatomaceous silica, talc, chalk, and the like. Such concentrates may be formulated, if desired, for direct use as dust treating compositions, or may be diluted, if desired, with additional inert solid carriers to produce dusting powders containing around 1 to 50 percent by weight of the benzoate ester toxicant. Alternatively, dispersing and/or wetting agents may be incorporated along with the benzoate ester in the solid carrier to form wettable powder concentrates which subsequently may be dispersed in water or other aqueous carrier to form spray compositions. Suitable wetting and emulsifying agents include sodium lignosulfate, sulfonate-oxide condensate blends, sulfonate non-ionic blends, anionic wetting agents, and the like.

Further, the benzoate ester toxicant may be incorporated in solutions, simple dispersions, aerosol formulations and other media adaptable to be employed for treating vegetation.

In operating according to the method of the present invention, the toxicant composition is applied to infected or susceptible plant surfaces in any convenient fashion such as spraying, dusting, dipping, or drenching. A spray method is considered preferable, especially when large numbers of plants are involved, because of the rapidity and uniformity of treatment possible. In spraying, it is usually sufficient for the infected or susceptible surfaces to be thoroughly wet with the liquid dispersion employed. Good results have been obtained by employing spray compositions whether they be emulsions or aqueous dispersions of solid concentrates.

The following examples illustrate the invention but are not to be construed as limiting.

EXAMPLE 1

The evaluation of the effectiveness of compounds exemplified by the above formula against *Phytophthora infestans,* the causative organism of late blight of tomato, was accomplished in the greenhouse in the following manner.

Fungicidal compositions were prepared by dissolving 40 mg. of the compound to be tested in 1 ml. of a solution of cyclohexanone containing 55 mg. of sulfonate non-ionic blend (Toximul R and S, Stepan Chemical Company, Northfield, Illinois) and diluting to a volume of 100 ml. with water. This composition then contained 400 p.p.m. of fungicide. To prepare a composition containing 1000 p.p.m., 100 mg. of the compound to be tested was dissolved in 1 ml. of the cyclohexanone-sulfonate non-ionic blend solution and then diluted to a volume of 100 ml. with water.

Four tomato seeds (Bonny Best variety) were planted in 4-inch plastic pots in sterilized soil and allowed to germinate, and the seedlings were thinned to two plants per pot. Twenty-eight days from the day of planting the test chemicals, compounded as described above, were sprayed on all leaf surfaces of the tomato plants and allowed to dry. A spore suspension of *Phytophthora infestans* was applied to the foliage with a sprayer, after which all plants were then placed in a moist chamber for 24 hours. At the end of this 24-hour period, the plants were returned to the greenhouse. After three days in the greenhouse, the plants were observed for development of the characteristic lesions or spots of late blight. The number of spots appearing on the treated plants was compared with the check plants and rated for the control of fungus achieved. The control rating scale used was as follows:

0—no control
1—slight control
2—moderate control
3—good control
4—complete control, no fungus Chart 1 which follows sets forth the results of the testing of several benzoate esters against *Phytophthora infestans.* In the chart, column 1 gives the name of the compound; column 2, the rate in terms of mcg./ml. or p.p.m. which the compound was applied to the test plants; and column 3, the protection rating of the compound.

CHART 1

| Compound | Application Rate, mcg./ml. | Protection Rating |
|---|---|---|
| γ-(2-methylpiperidino)propyl 3,4-dichlorobenzoate | 400 | 3 |
|  | 80 | 3 |
|  | 16 | 2 |
| γ-(2-methylpiperidino)propyl 3,4-dichlorobenzoate hydrochloride | 1,000 | 2– |
|  | 400 | 3 |
|  | 80 | 2 |
|  | 16 | 2 |
| α-Methyl-δ-diethylaminobutyl 3,4-dichlorobenzoate | 400 | 2 |
|  | 80 | 1 |
| γ-(di-n-butylamino)propyl 3,4-dichlorobenzoate | 400 | 1 |
|  | 80 | 2 |
|  | 16 | 1 |
| γ-(2,2,4,6-tetramethylpiperidino)propyl 3,4-dichlorobenzoate | 400 | 1.5 |
| γ-(2,6-dimethylpiperidino)propyl 3,4-dichlorobenzoate | 400 | 1.5 |

EXAMPLE 2

The compounds of the present invention were further tested against *Erysiphe polygoni*, the causative organism of bean powdery mildew.

Fungicidal compositions were prepared as described in Example 1.

Three bean seeds (Kentucky Wonder variety) were planted in 4-inch clay pots and allowed to germinate, and the plants were thinned to two plants per pot. Ten days from the day of planting, the test chemicals, compounded as described above, were sprayed on all leaf surfaces of the bean plants and allowed to dry. The plants were then placed in the greenhouse and Kentucky Wonder beans heavily infested with powdery mildew were placed above them for about five days, after which they were removed. At the end of five additional days the plants were observed for development of the disease. The appearance of the treated plants was compared with that of the check plants and ratings of the control of the fungus were recorded. The control rating scale is the same as for Example 1. Results are set forth in Chart 2.

CHART 2

| Compound | Application Rate, mcg./ml. | Protection Rating |
|---|---|---|
| γ-(2-methylpiperidino)propyl 3,4-dichlorobenzoate | 400 | 4 |
|  | 80 | 3.6 |
|  | 16 | 1.6 |
| γ-(2-methylpiperidino)propyl 3,4-dichlorobenzoate hydrochloride | 1,000 | 3 |
|  | 400 | 3 |
|  | 80 | 2 |
|  | 16 | 1 |
| γ-(2-methylpiperidino)propyl 2,5-dichlorobenzoate | 1,000 | 4 |
|  | 400 | 3.5 |
| γ-(2-methylpiperidino)propyl 3-iodo-4-fluorobenzoate hydrochloride | 1,000 | 4 |
|  | 400 | 3 |
| γ-(2-methylpiperidino)propyl 2,4-dichlorobenzoate | 1,000 | 3 |
|  | 400 | 4 |
|  | 80 | 2 |
| γ-(2-methylpiperidino)propyl 2,6-dichlorobenzoate | 1,000 | 4 |
|  | 400 | 4 |
|  | 80 | 2 |
| 2-morpholinoethyl 3,4-dichlorobenzoate | 1,000 | 2– |
| γ-(2,2,4,6-tetramethylpiperidino)propyl 3,4-dichlorobenzoate | 400 | 1.5 |
| ω-(2-methylpiperidino)-n-hexyl 3,4-dichlorobenzoate | 400 | 2 |
| γ-(3-methylpiperidino)propyl 3,4-dichlorobenzoate | 400 | 2– |
| γ-(2,6-dimethylpiperidino)propyl 3,4-dichlorobenzoate | 400 | 3 |
|  | 80 | 3 |
|  | 16 | 2 |
| γ-(4-methylpiperidino)propyl 3,4-dichlorobenzoate | 400 | 2– |
| ω-(2-methylpiperidino)-n-decyl 3,4-dichlorobenzoate | 400 | 3 |

EXAMPLE 7

The compounds of the present invention were tested against *Colletotrichum lagenarium*, the causative organism of cucumber anthracnose. Formulation of the fungicides was done as described in Example 1.

Four cucumber seeds (Green Prolific variety) were planted in sterilized soil in 4-inch plastic pots, and after germination the plants were thinned to two per pot. On the fifteenth day after planting the test chemical was sprayed on all leaf surfaces and allowed to dry. A spore suspension of *Colletorotrichum lagenarium* was applied to the foliage by means of a sprayer, and all plants were then placed in the moist chamber for 40 hours. On the seventeenth day, the plants were returned to the greenhouse, and allowed to remain for 8 days, at which time the plants were observed for development of disease symptoms, compared with the check plants, and rated for control. The same values for the rating system were used as in Example 1. Results are shown in Chart 3.

CHART 3

| Compound | Application Rate, mcg./ml. | Protection Rating |
|---|---|---|
| γ-(2-methylpiperidino)propyl 3,4-dichlorobenzoate | 400 | 4 |
|  | 80 | 3 |
|  | 16 | 2 |
| γ-(2-methylpiperidino)propyl 3,4-dichlorobenzoate hydrochloride | 400 | 3 |
|  | 80 | 3 |
|  | 16 | 3 |
| β-Diethylaminoethyl 3,4-dichlorobenzoate hydrochloride | 400 | 3 |
|  | 80 | 1.5 |
|  | 16 | 1 |
| β-Dimethylaminoethyl 3,4-dichlorobenzoate | 400 | 2 |
| 2-morpholinoethyl 2,5-dichlorobenzoate | 1,000 | 2– |
| γ-(2,6-dimethylpiperidino)propyl 3,4-dichlorobenzoate | 400 | 3+ |
| γ-(2,2,4,6-tetramethylpiperidino)propyl 3,4-dichlorobenzoate | 400 | 3 |
| ω-(2-methylpiperidino)-n-decyl 3,4-dichlorobenzoate | 400 | 2 |

EXAMPLE 4

The compounds of the present invention were tested against *Uromyces phaseoli* var. *typica*, causative organism of bean rust. Formulation of the fungicidal compositions was done as described in Example 1.

Three bean seeds were planted in 4-inch clay pots and later thinned to two plants per pot. On the tenth day the test chemical was sprayed on all leaf surfaces and allowed to dry. A spore suspension of *Uromyces phaseoli* var. *typica* was applied to the foliage with a sprayer. All the plants were immediately placed in the moist chamber for 24 hours and then returned to the greenhouse. On the twentieth day the plants were observed for development of the disease, the treated plants compared with the check plants, and ratings of the control of the fungus recorded. The results, using the same rating system as in Example 1, are given in Chart 4.

CHART 4

| Compound | Application Rate, mcg./ml. | Protection Rating |
|---|---|---|
| γ-(2-methylpiperidino)propyl 3,4-dichlorobenzoate | 400 | 4 |
|  | 80 | 3 |
|  | 16 | 2 |
| β-Diethylaminopropyl 3,4-dichlorobenzoate | 400 | 3 |
|  | 80 | 2 |
|  | 16 | 1 |
| γ-(di-n-butylamino)propyl 3,4-dichlorobenzoate | 400 | 3 |
| γ-(2-methylpiperidino)propyl 2,6-dichlorobenzoate | 400 | 3+ |
| γ-(2-methylpiperidino)propyl 2,5-dichlorobenzoate | 400 | 2– |
| β-Dimethylaminoethyl 3,4-dichlorobenzoate | 400 | 2– |
| α-Methyl-β-dimethylaminoethyl 3,4-dichlorobenzoate | 400 | 2 |
| α-Methyl-δ-diethylaminobutyl 3,4-dichlorobenzoate | 400 | 2.5 |

Besides the greenhouse evaluations described above, testing of γ-(2-methylpiperidino)propyl 3,4-dichlorobenzoate was carried out in the field against certain organisms which damage crop plants and others which severely injure ornamental plants.

A 25 percent wettable powder composition was prepared by mixing 25 parts by weight of γ-(2-methylpiperidino)propyl 3,4 - dichlorobenzoate, 63 parts by weight of diatomaceous silica, 10 parts by weight of ultrafine hydrated silica, and 1 part each by weight of highly purified sodium lignosulfate and an anionic wetting agent (Nopco anionic wetting agent, Nopco Chemical Co., Newark, N.J.). When 181.7 g. of this 25 percent wettable powder was placed in 10 gallons of water, the equivalent of 1 lb. of active material per 100 gallons of water was obtained.

In addition, an emulsifiable concentrate was prepared by mixing 30 parts of γ-(2-methylpiperidino)propyl 3,4-dichlorobenzoate, 62 parts of heavy aromatic naphtha, 5 parts aromatic sulfonate-oxide condensate blend, and 3 parts sulfonate non-ionic blend. These proportions provide a dilution ratio such that 150 ml. of the concentrate brought up to 10 gallons with water gave an emulsion of 1200 p.p.m. of fungicidal agent.

EXAMPLE 5

The ability of γ-(2-methylpiperidino)propyl 3,4-dichlorobenzoate to combat *Venturia inaequalis*, the causative organism of apple scab, was tested.

A 25 percent wettable powder composition of γ-(2-methylpiperidino)propyl 3,4-dichlorobenzoate was used at dosages of 0.5 and 1 lb. of active material per 100 gallons of water in the treatment of *Venturia inaequalis*.

A block of 56 four-year-old apple trees of the McIntosh variety was used, randomization of treatments being accomplished by employing a modified Latin square design. Each treatment was applied to eight trees. A standard orchard sprayer specially modified to spray small volumes of spray materials was used with a three-nozzle orchard boom to apply the materials.

All treatments were properly weighed, added to a small volume of water, thoroughly mixed, and brought to a final volume of 10 gallons of water. Each tree was then sprayed at a pressure of 250 p.s.i. until run-off. Applications were made May 9, 15, 22, 29; June 6, 12, 19, 26; July 2, 10, 17, 24, and 31.

Each tree of every treatment was observed for foliar lesions caused by the apple scab fungus. Ten terminals (branches) were selected at random on each tree and the percentage of leaves with apple scap lesions was determined for each terminal.

Results of the treatment are shown in Chart 5. Column 1 gives the name of the compound; column 2, the rate of application in terms of pounds per 100 gallons of mixture; and columns 3, 4, 5, and 6, the percent of foliage on 80 terminals with apple scab lesions on the dates evaluated.

CHART 5

| Compound | Application Rate, lb./100 gal. | Percent Foliage with Apple Scab Lesions | | | |
|---|---|---|---|---|---|
| | | Date Evaluated | | | |
| | | 7/17 | 8/1 | 8/17 | 9/11 |
| Control | 0 | 87.6 | 87.1 | 89.7 | 94.0 |
| -(2-methylpiperidino) propyl 3,4-dichlorobenzoate | 1 | 4.3 | 2.3 | 2.75 | 2.87 |
| Do | 0.5 | 35.1 | 24.4 | 23.6 | 45.4 |

EXAMPLE 6

A field trial was run to determine the efficacy of γ-(2-methylpiperidino)propyl 3,4 - dichlorobenzoate against *Erysiphe cichoracearum*, the causal organism of powdery mildew on cantaloupe.

The fungicidal compound formulated as a 25 percent wettable powder, *supra*, was used at dosages of 0.5 and 1 lb. of active material per 100 gallons of water.

In addition, the fungicidal compound, formulated as an emulsifiable concentrate, *supra*, was used at a dosage of 0.5 lb. of active material per 100 gallons of water.

A four block experimental design was employed, each block measuring 36 feet by 78 feet and containing fourteen rows seeded with the Harvest Queen variety of cantaloupe. Each treatment was applied to one row in every block using a specially constructed high clearance row-crop sprayer equipped with six nozzles.

All treatments were properly weighed or measured and thoroughly mixed with 10 gallons of water, and the plants were sprayed at a pressure of 200 p.s.i. until run-off. Applications of the fungicide were made June 22, 27; July 5, 11, 18, 25; August 2, 7, 14, 21, 28; and September 5 and 12.

To evaluate the incidence of disease, two hundred leaves were selected at random on each row of every treatment and the percentage of the counted leaves with signs or symptoms of the casual agent determined.

The effectiveness of γ-(2-methylpiperidino)propyl 3,4-dichlorobenzoate in combatting *Erysiphe cichoracearum* is shown in Chart 6. Column 1 gives the name of the compound; column 2, the rate of application in terms of pounds per 100 gallons of mixture; and columns 3 and 4, the percent of leaves with signs or symptoms of the casual agent on the dates determined.

CHART 6

| Compound | Application Rate, lb./100 gal. | Percent Foliage Diseased | |
|---|---|---|---|
| | | 9/13 | 9/20 |
| Control | 0 | 36.9 | 34.6 |
| γ-(2-methylpiperidino)propyl 3,4-dichlorobenzoate | 0.5 WP | 0.6 | 0.1 |
| Do | 1 WP | 0.2 | 0.4 |
| Do | 0.5 EC | 0.1 | 0.1 |

WP=wettable powder; EC=emulsifiable concentrate.

EXAMPLE 7

In a further field trial, the efficacy of γ-(2-methylpiperidino)propyl 3,4-dichlorobenzoate in controlling *Sphaerotheca pannosa* var. *rosae*, the casual organism of powdery mildew of rose, was examined.

The fungicide was formulated as a 25 percent wettable powder and as an emulsifiable concentrate, both previously described.

A total of 300 roses, 100 each of the Poinsettia, Peace, and Crimson Glory varieties, were used in this experiment. All roses were planted on six-foot centers in 20 rows, each row containing 15 bushes, five of each variety.

All treatment were properly weighed or measured and thoroughly mixed with five gallons of water. Each bush was sprayed at a pressure of 250 p.s.i. until run-off using a specially constructed high clearance row-crop sprayer equipped with six nozzles. Applications were made June 7, 14, 21, 28; July 5, 12, 18, 24; and August 1.

Each rose bush of every treatment was evaluated by two observers for the percent foliage diseased by *S. pannosa* var. *rosae*, and the results appear in Chart 7 which follows. Column 1 lists the compound used; column 2, the rate of application; and columns 3 through 9, the percent rose foliage with powdery mildew of each variety of rose on the dates evaluated.

CHART 7

| Compound | Application Rate lb./100 gal. | Poinsettia | | | Peace | | | Crimson Glory | | |
|---|---|---|---|---|---|---|---|---|---|---|
| | | 7/11 | 7/24 | 8/1 | 7/11 | 7/24 | 8/1 | 7/11 | 7/24 | 8/1 |
| Control | 0 | 59.5 | 84.0 | 69.0 | 46.0 | 7.5 | 4.0 | 6.0 | 7.5 | 18.5 |
| γ-(2-methylpiperidino)propyl 3,4-dichlorobenzoate | 1 WP | 1.6 | 1.2 | 1.8 | 1.6 | 1.0 | 1.6 | 1.6 | 1.0 | 1.6 |
| Do | 0.5 EC | 2.0 | 4.0 | 3.0 | 0.0 | 1.2 | 0.8 | 1.6 | 1.6 | 1.8 |
| Do | 1 EC | 4.0 | 5.0 | 3.5 | 1.0 | 1.0 | 1.0 | 1.0 | 1.6 | 2.0 |

WP=wettable powder; EC=emulsifiable concentrate.

EXAMPLE 8

An evaluation of the fungicidal effectiveness of γ-(2-methylpiperidino)propyl 3,4 - dichlorobenzoate against *Microsphaera alni*, var. *vaccinii*, casual organism of powdery mildew of catalpa, was made.

The fungicide was formulated as an emulsifiable concentrate, as previously described, and used at a dosage of 1 lb. of active material per 100 gallons of water.

A total of twenty-four catalpa trees were used in this experiment. An orchard sprayer, specially modified to spray small volumes of spray materials, was used with a three-nozzle orchard boom to spray at a pressure of 250 p.s.i. until run-off. Applications of the fungicidal mixture were made on July 12, 19, 26; August 1, 9, 14, 21, 28; September 6 and 13.

The evaluation of the incidence of disease was done by selecting one hundred leaves at random on each tree receiving treatment, and determining the percentage of the counted leaves with signs or symptoms of the casual agent. The results of this evaluation appear in Chart 8. Column 1 lists the name of the compound used; column 2, the rate of application; and columns 3, 4, and 5, the percent catalpa foliage with powdery mildew.

CHART 8

| Compound | Application Rate, lb./100 gal. | Percent Catalpa Foliage with Powdery Mildew | | |
|---|---|---|---|---|
| | | 8/22 | 9/6 | 9/18 |
| Control | 0 | 42.8 | 47.9 | 51.8 |
| γ-(2-methylpiperidino)propyl 3,4-dichlorobenzoate | 1 EC | 0.0 | 0.0 | 0.0 |

EC=emulsifiable concentrate.

EXAMPLE 9

The fungicidal activity of γ-(2-methylpiperidino)propyl 3,4-dichlorobenzoate against *Erysiphe cichoracearum*, which causes zinnia powdery mildew, and against *Cercospora zinniae*, which causes Cercospora leafspot of zinnia, was tested.

The fungicide was formulated as an emulsifiable concentrate, as described above, and used at a dosage of 1 lb. of active material per 100 gallons of water. Application was done using a specially constructed high-clearance row-crop sprayer equipped with six nozzles, and plants were sprayed to run-off.

In this experiment, two blocks, each 20 feet by 36 feet, were used, each block containing six double planted rows of the State Fair variety of zinnia. Every treatment was replicated in each block. Applications were made July 13, 20, 26; August 2, 8, 15, 22, 29; and September 6 and 13.

The results were determined as follows. Twenty-five terminals of plants in each treatment row were evaluated for percentage of leaves per terminal with signs or symptoms of *E. cichoracearum* or *C. zinniae*, and the results are shown in Chart 9. Column 1 lists the name of the compound; column 2, rate of application; and columns 3, 4, 5, and 6, the percent of foliage diseased on the date evaluated.

CHART 9

| Compound | Application Rate, lb./100 gal. | Percent Foliage Diseased | | | |
|---|---|---|---|---|---|
| | | Powdery Mildew | | Leaf Spot | |
| | | 9/13 | 9/21 | 9/13 | 9/21 |
| Control | 0 | 60.3 | 74.0 | 17.8 | 22.3 |
| γ-(2-methylpiperidino)propyl 3,4-dichlorobenzoate | 1 EC | 1.0 | 0.4 | 0.4 | 3.8 |

EC=emulsifiable concentrate.

EXAMPLE 10

A study was made to determine the ability of γ-(2-methylpiperidino)propyl 3,4-dichlorobenzoate to control *Microsphaera alni*, causal organism of powdery mildew of lilac.

The fungicide was formulated as an emulsifiable concentrate at a dosage of 1 lb. of active ingredient per 100 gallons of water. The material was applied using a sprayer specially modified to spray small volumes of spray materials, and each of the twenty lilac bushes used in the test was sprayed to run-off. Applications were made on July 13, 19, 26; August 1, 8, 14, 22, 28; September 5 and 11.

Each lilac bush was evaluated for the percent foliage with signs or symptoms of *M. alni*. The results are listed in Chart 10. Column 1 lists the name of the compound tested; column 2, the rate of application; and columns 3 and 4, the percent foliage diseased on the date evaluated.

CHART 10

| Compound | Application Rate, lb./100 gal. | Percent Foliage Diseased | |
|---|---|---|---|
| | | 9/15 | 9/18 |
| Control | 0 | 14.4 | 62.6 |
| γ-(2-methylpiperidino)propyl 3,4-dichlorobenzoate | 1 EC | 0.0 | 0.0 |

EC=emulsifiable concentrate.

The compounds of the present invention can readily be prepared in the following manner.

A solution of an appropriate alkylaminoalkanol in chloroform is prepared and to it is added a chloroform solution of an appropriate substituted benzoyl chloride, followed by refluxing for about 3–4 hours.

The reaction mixture is concentrated in vacuo on the steam bath, and the residue, containing the crude alkylaminoalkyl benzoate ester hydrochloride, is dissolved in water. The aqueous solution is made basic with aqueous sodium hydroxide or potassium hydroxide solution and the freed organic base is extracted with ether. The ether solution is washed with water, dried, and distilled to yield the desired fungicidal compound.

The following will serve to illustrate the preparation.

*Preparation 1.—γ-(2-methylpiperidino) propyl 3,4-dichlorobenzoate*

A solution of 156.2 g. (1 mole) of γ-(2-methylpiperidino)propyl alcohol in 900 ml. chloroform was prepared and 150 ml. (2 moles) of thionyl chloride were added at a rate promoting gentle refluxing. When addition was complete, the mixture was refluxed for 3 hours.

The reaction mixture was evaporated to dryness in vacuo on the steam bath and the residue recrystallized from boiling ethyl alcohol to yield 176 g. (83 percent) of γ-(2-methylpiperidino)propyl chloride hydrochloride having a melting point of about 170–174.5° C.

The material thus obtained was dissolved in water and the solution basified with potassium hydroxide, thus liberating the free base, γ-(2-methylpiperidino)propyl chloride, which was extracted with ether. The ether solution was washed with water, dried over magnesium sulfate, and concentrated in vacuo on the steam bath to yield 125.5 g. of purified γ-(2-methylpiperidino)propyl chloride.

A mixture of 137.5 g. (0.72 mole) of 3,4-dichlorobenzoic acid and 125.5 g. (0.72 mole) of γ-(2-methylpiperidino)propyl chloride in 850 ml. of isopropyl alcohol was refluxed for 24 hours. After cooling, the reaction mixture was filtered and the solid product washed with ether. In this manner, 181.0 g. of γ-(2-methylpiperidino)propyl 3,4-dichlorobenzoate hydrochloride was obtained. A sample recrystallized from ethyl alcohol had a melting point of about 172–174° C.

*Analysis.*—Calc.: N, 3.82; Cl, 29.01. Found: N, 3.88; Cl, 29.70.

The above hydrochloride was dissolved in water and the free base liberated by adding 0.55 mole of 50 percent sodium hydroxide solution. The free base was extracted with ether and the ether solution washed with water and dried and distilled to give 120 g. of γ-(2-methylpiperidino)propyl 3,4-dichlorobenzoate having a boiling point of about 156–157° C. at 0.20 mm.; $n_D^{25}$=1.5344–1.5345.

*Analysis.*—Calc.: C, 58.19; H, 6.40; N, 4.24. Found: C, 59.57; H, 6.51; N, 4.07.

The same compound can be prepared by the following alternative method.

*Preparation 2.*—γ-(2-methylpiperidino) propyl 3,4-dichlorobenzoate

A solution of 312.4 g. (2.0 moles) of γ-(2-methylpiperidino)propyl alcohol in 2 liters of chloroform was prepared and to the solution was added a solution of 418.8 g. (2.0 moles) of 3,4-dichlorobenzoyl chloride in 500 ml. of chloroform. After the addition was complete, the mixture was refluxed for 3 hours.

The reaction mixture was evaporated to dryness in vacuo on the steam bath and the residue, γ-(2-methylpiperidino) propyl 3,4-dichlorobenzoate hydrochloride, was dissolved in water. The solution was made basic by adding 133.2 g. (2.2 moles) of cold aqueous potassium hydroxide solution and the liberated base was extracted with ether. The ether solution was dried and distilled. A total of 492.7 g. (75 percent) of γ-(2-methylpiperidino)propyl 3,4-dichlorobenzoate was obtained as a liquid having a boiling point of about 160–166° C./0.3 mm.

The following is an additional modification of the above procedure.

*Preparation 3.*—γ-(2-methylpiperidino) propyl 3,4-dichlorobenzoate

A solution of 156 g. (1.0 mole) of γ-(2-methylpiperidino)propyl alcohol in one liter of chloroform was heated to refluxing and a solution of 210 gm. (1.0 mole) of 3,4-dichlorobenzoyl chloride in 250 ml. of chloroform was added slowly via a dropping funnel. When the addition was complete, the reaction mixture was refluxed for 3 hours, after which one liter of chloroform was distilled off. To the warm (temp. 50–60° C.) remaining solution were added 2 liters of hexane. The mixture was refluxed for 30 minutes and cooled to 10° C. The solid, crude γ-(2-methylpiperidino)propyl 3,4-dichlorobenzoate hydrochloride precipitated thereby was recovered by filtering on a Buechner funnel. The solid product was washed several times with hexane. Next the solid, crystalline product was slurried with hexane then filtered and washed with ether to remove unwanted starting material, impurities, and the like.

The amino ester hydrochloride thus obtained was suspended in a mixture of one liter of ether and two liters of water. The mixture was basified in the cold by adding 80 gm. of 50 percent aqueous sodium hydroxide solution. The ether solution of the free base, γ-(2-methylpiperidino)propyl 3,4-dichlorobenzoate, was separated and the basic, aqueous layer discarded. The ether solution was washed free of chloride ions with de-ionized water and dried first over sodium sulfate, then over magnesium sulfate. After filtering, the drying agent was washed with ether and the total ether solution concentrated to dryness to yield 261 g. of the desired product (79 percent).

*Preparation 4.*—α-Methyl-β-dimethylaminoethyl 3,4-dichlorobenzoate

Following the procedure of Preparation 2 and using 3,4-dichlorobenzoyl chloride and α-methyl-β-dimethylaminoethanol as the reactants, α-methyl-β-dimethylaminoethyl 3,4- dichlorobenzoate was obtained as a liquid having a boiling point of about 114–117.5° C./0.35 mm.; $n_D^{25}$=1.5218–1.5220.

*Analysis.*—Calc.: C, 52.19; H, 5.48; N, 5.07 Found: C, 52.17; H, 5.44; N, 5.00.

*Preparation 5.*—β-Dimethylaminoethyl 3,4-dichlorobenzoate

Following the procedure of Preparation 2 and using 3,4-dichlorobenzoyl chloride and β-dimethylaminoethanol as the reactants, β-dimethylaminoethyl 3,4-dichlorobenzoate was obtained as a liquid having a boiling point of about 120–121° C./0.26 mm.; $n_D^{25}$=1.5320–1.5322.

*Analysis.*—Calc.: C, 50.42; H, 5.00; N, 5.34. Found: C. 50.17; H, 5.08; N, 5.24.

*Preparation 6.*—β-(Diethylamino) propyl 3,4-dichlorobenzoate

Following the procedure of Preparation 2 and using 3,4-dichlorobenzoyl chloride and β-(diethylamino)propyl alcohol as the reactant, β-(diethylamino)propyl 3,4-dichlorobenzoate was obtained as a liquid having a boiling point of about 130.5–134° C./0.35 mm.; $n_D^{25}$=1.5135–1.5145.

*Analysis.*—Calc.: C, 55.27; H, 6.29; N, 4.61. Found: C, 55.88; H, 6.36; N, 4.59.

*Preparation 7.*—α-methyl-δ-diethylaminobutyl 3,4-dichlorobenzoate

Following the procedure of Preparation 2 and using 3,4-dichlorobenzoyl chloride and 1-methyl-4-diethylaminobutyl alcohol as reactants, α-methyl-δ-diethylaminobutyl 3,4 dichlorobenzoate was obtained as a liquid having a boiling point of about 155–159° C./0.45 mm.; $n_D^{25}$=1.5121–1.5130.

*Analysis.*—Calc.: C, 57.83; H, 6.98; N, 4.22. Found: C, 57.63; H, 6.88; N, 4.16.

*Preparation 8.*—β-(Di-n-butylamino) propyl 3,4-dichlorobenzoate

Following the procedure of Preparation 2 and using 3,4-dichlorobenzoyl chloride and β-(di-n-butylamino) propyl alcohol as the reactants, β-(di-n-butylamino) propyl 3,4-dichlorobenzoate was obtained as a liquid having a boiling point of about 162.5–166° C./0.30 mm.; $n_D^{25}$=1.5072–1.5075.

*Anaylsis.*—Calc.: C, 60.00; H, 7.55; N, 3.89. Found: C, 60.11; H, 7.56; N, 3.69.

*Preparation 9.*—γ-(Diethylamino) propyl 3,4-dichlorobenzoate

Following the procedure of Preparation 2 and using 3,4-dichlorobenzoyl chloride and γ-(diethylamino)propyl alcohol as the reactants, γ-(diethylamino)propyl 3,4-dichlorobenzoate was obtained as a liquid having a boiling point of about 140.5–145.5° C./0.13 mm.; $n_D^{25}$=1.5195–1.5197.

Preparation 10.—γ-(Di-n-butylamino) propyl 3,4-dichlorobenzoate

Following the procedure of Preparation 2 and using 3,4-dichlorobenzoyl chloride and γ-(di-n-butylamino) propyl alcohol as reactants, γ-(di-n-butylamino)propyl 3,4-dichlorobenzoate was obtained as a liquid having a boiling point of about 163.5° C./0.25 mm.; $n_D^{25}=1.5087$.

Analysis.—Calc.: C, 60.00; H, 7.55; N, 3.89. Found: C, 59.80; H, 7.61; N, 3.63.

Preparation 11.—γ-Morpholinopropyl 3,4-dichlorobenzoate

Following the procedure of Preparation 2 and using 3,4-dichlorobenzoyl chloride and γ-morpholinopropyl alcohol as reactants, γ-morpholinopropyl 3,4-dichlorobenzoate was obtained which was purified as the hydrochloride having a melting point of about 199–200° C.

Analysis.—Calc.: C, 47.40; H, 5.11; N, 3.95 Found: C, 47.46; H, 5.02; N, 3.77.

Preparation 12.—γ-(2-methylpiperidino)propyl 2,4-dichlorobenzoate

Following the procedure of Preparation 2 and using 2,4-dichlorobenzoyl chloride and γ-(2-methylpiperidino) propyl alcohol as the reactants, γ-(2-methylpiperidino) propyl 2,4-dichlorobenzoate was obtained as a liquid having a boiling point of about 144–148° C./0.06 mm.; $n_D^{25}=1.5354$–1.5358.

Analysis.—Calc.: C, 58.19; H, 6.41; N, 4.24. Found: C, 57.99; H, 6.44; N, 4.13.

Preparation 13.—γ-(2-methylpiperidino)propyl 2,6-dichlorobenzoate

Following the procedure of Preparation 2 and using 2,6-dichlorobenzoyl chloride and γ-(2-methylpiperidino) propyl alcohol as the reactants, γ-(2-methylpiperidino) propyl 2,6-dichlorobenzoate was obtained as a liquid having a boiling point of about 142–144° C./0.07 mm.; $n_D^{25}=1.5270$.

Analysis.—Calc.: C, 58.19; H, 6.40; N, 4.24. Found: C, 57.96; H, 6.54; N, 4.16.

Preparation 14.—γ-(2-methylpiperidino)propyl 2,5-dichlorobenzoate

Following the procedure of Preparation 2 and using 2,5-dichlorobenzoyl chloride and γ-(2-methylpiperidino) propyl alcohol as the reactants, γ-(2-methylpiperidino) propyl 2,5-dichlorobenzoate was obtained as a liquid having a boiling point of about 163–167.5° C./0.45 mm.; $n_D^{25}=1.5341$–1.5350.

Analysis.—Cal.: C, 58.19; H, 6.40; N, 4.24. Found: C, 57.90; H, 6.58; N, 4.10.

Preparation 15.—γ-Morpholinopropyl 2,5-dichlorobenzoate

Following the procedure of Preparation 2 and using 2,5-dichlorobenzoyl chloride and γ-morpholinopropyl alcohol as the reactants, γ-morpholinopropyl 2,5-dichlorobenzoate was obtained as a liquid having a boiling point of about 150–156° C./0.24 mm.; $n_D^{25}=1.5408$–1.5412.

Analysis.—Calc.: C, 52.84; H, 5.38; N, 4.40. Found: C, 52.81; H, 5.49; N, 4.37.

Preparation 16.—β-Morpholinoethyl 2,5-dichlorobenzoate

Following the procedure of Preparation 2 and using 2,5-dichlorobenzoyl chloride and 2-morpholinoethyl alcohol as the reactants, β-morpholinoethyl 2,5-dichlorobenzoate was obtained as a liquid having a boiling point of about 149–150° C./0.17 mm.; $n_D^{25}=1.5460$.

Analysis.—Calc.: C, 51.33; H, 4.97; N, 4.60. Found: C, 51.31; H, 4.85; N, 4.76.

Preparation 17.—β-Morpholinoethyl 3,4-dichlorobenzoate

Following the procedure of Preparation 2 and using 3,4-dichlorobenzoyl chloride and 2-morpholinoethyl alcohol as the reactants, β-morpholinoethyl 3,4-dichlorobenzoate was obtained as a liquid having a boiling point of about 151–154° C./0.15 mm.

Analysis.—Calc.: C, 51.33; H, 4.97; N, 4.60. Found: C, 51.57; H, 4.83; N, 4.59.

Preparation 18.—γ-(3-methylpiperidino)propyl 3,4-dichlorobenzoate

Following the procedure of Preparation 2 and using 3,4-dichlorobenzoyl chloride and γ-(3-methylpiperidino) propyl alcohol as reactants, γ-(3-methylpiperidino)propyl 3,4-dichlorobenzoate was obtained as a liquid having a boiling point of about 162° C./0.10 mm.; $n_D^{25}=1.5322$.

Analysis.—Calc.: C, 58.19; H, 6.40; N, 4.24. Found: C, 58.25; H, 6.13; N, 4.44.

Preparation 19.—γ-(4-methylpiperidino)propyl 3,4-dichlorobenzoate

Following the procedure of Preparation 2 and using 3,4-dichlorobenzoyl chloride and γ-(4-methylpiperidino) propyl alcohol as reactants, γ-(4-methylpiperidino)propyl 3,4-dichlorobenzoate was obtained as a liquid having a boiling point of about 163–164° C./0.11 mm.; $n_D^{25}=1.5311$.

Analysis.—Calc.: C, 58.19; H, 6.40; N, 4.24. Found: C, 57.67; H, 6.45; N, 4.22.

Preparation 20.—ω-(2-methylpiperidino)-n-hexyl 3,4-dichlorobenzoate

Following the procedure of Preparation 2 and using 3,4-dichlorobenzoyl chloride and ω-(2-methylpiperidino)-n-hexanol as reactants, ω-(2-methylpiperidino)-n-hexyl 3,4-dichlorobenzoate was obtained as a liquid having a boiling point of about 166–167° C./0.02 mm.; $n_D^{25}=1.5268$.

Analysis.—Calc.: C, 61.29; H, 7.30; N, 3.76. Found: C, 61.17; H, 7.42; N, 3.62.

Preparation 21.—γ-(2,2,4,6-tetramethylpiperidino)propyl 3,4-dichlorobenzoate Following the procedure of Preparation 2 and using 3,4-dichlorobenzoyl chloride and γ-(2,2,4,6-tetramethylpiperidino)propyl alcohol as reactants, γ-(2,2,4,6-tetramethylpiperidino)propyl 3,4-dichlorobenzoate was obtained as a liquid having a boilinng point of about 154–159° C./0.015 mm.

Analysis.—Calc.: C, 61.29; H, 7.30; N. 3.76. Found: C, 61.22; H, 7.26; N, 3.68.

Preparation 22.—γ-(2,6-dimethylpiperidino)propyl 3,4-dichlorobenzoate

Following the procedure of Preparation 2 and using 3,4-dichlorobenzoyl chloride and γ-(2,6-dimethylpiperidino)propyl alcohol as reactants, γ-(2,6-dimethylpiperidino)propyl 3,4-dichlorobenzoate was obtained as a liquid having a boiling point of about 158–162° C./0.025 mm.; $n_D^{25}=1.5348$.

Analysis.—Calc.: C, 59.30; H, 6.73; N, 4.07. Found: C, 58.52; H, 6.56; N, 4.06.

Preparation 23.—γ-(2-methylpiperidino)propyl 3,5-dichlorobenzoate

Following the procedure of Preparation 2 and using 3,5-dichlorobenzoyl chloride and γ-(2-methylpiperidino) propyl alcohol as reactants, γ-(2-methylpiperidino)propyl 3,5-dichlorobenzoate was obtained as a liquid having a boiling point of about 166–168° C./0.22 mm.; $n_D^{25}=1.5310$.

Analysis.—Calc.: C, 58.19; H, 6.40; N, 4.24. Found: C, 58.15; H, 6.54; N, 4.32.

Preparation 24.—γ-(2-methylpiperidino)-2-butenyl 3,4-dichlorobenzoate

Following the general procedure of F. F. Blicke and J. H. Biel, J. Am. Chem. Soc., 79, 5508 (1957), a mixture of 75.8 g. (0.715 mole) of 1-hydroxy-2-chloro-3-butene and 228 g. (2.3 moles) of α-pipecoline was heated on the steam bath for an hour. The precipitated α-pipecoline hydrochloride was filtered off and the filtrate distilled to yield 4-(2-methylpiperidino)-2-butene-1-ol having a boiling point of about 86.5–87° C./0.13 mm.; $n_D^{25}$=1.4978.

*Analysis.*—Calc.: C, 70.95; H, 11.31; N, 8.27. Found: C, 71.09; H, 11.43; N, 8.49.

Following the procedure of Preparation 2 and using 3,4-dichlorobenzoyl chloride and 4-(2-methylpiperidino)-2-butene-1-ol as reactants, γ-(2-methylpiperidino)-2-butenyl 3,4-dichlorobenzoate was obtained as a liquid having a boiling point of about 166–167.5° C./0.1 mm.; $n_D^{25}$=1.5451.

*Analysis.*—Calc.: C, 59.65; H, 6.18; N, 4.09. Found: C, 59.58; H, 6.35; N, 3.94.

I claim:

1. A method for protecting plants from attack by fungi which comprises contacting a fungus-susceptible plant with a fungicidal amount of a substance selected from the group consisting of a compound having the following formula and the acid-addition salts thereof:

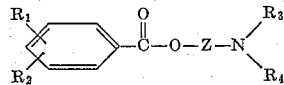

wherein $R_1$ and $R_2$ are halogen; $R_3$ and $R_4$ when taken separately are selected from the group consisting of $C_1$–$C_8$ alkyl and $C_1$–$C_4$ alkenyl; $R_3$ and $R_4$, when taken together with the nitrogen atom to which they are attached, represent a radical selected from the group consisting of morpholino, $C_4$–$C_5$ polymethyleneimino, and lower-alkyl substituted $C_4$–$C_5$ polymethyleneimino; and Z is selected from the group consisting of $C_2$–$C_{10}$ saturated alkylene, $C_2$–$C_{10}$ unsaturated alkylene, $C_2$–$C_{10}$ oxaalkylene, and $C_2$–$C_{10}$ thiaalkylene.

2. The method of claim 1 wherein said substance is applied in combination with an inert diluent.

3. The method of claim 1 wherein said substance is applied in combination with an inert diluent and a wetting agent.

4. The method of claim 1 wherein said substance is applied in a composition containing within the range of about ⅛ to about 2 lb. of fungicidally-active material per 100 gallons of water.

5. The method of claim 1 wherein γ-(2-methylpiperidino)propyl 3,4-dichlorobenzoate is the fungicidally-active substance.

6. The method of claim 1 wherein γ-(2-methylpiperidino)propyl 3,4-dichlorobenzoate hydrochloride is the fungicidally-active substance.

7. The method of claim 1 wherein γ-(2-methylpiperidino)propyl 2,6-dichlorobenzoate is the fungicidally-active substance.

8. The method of claim 1 wherein β-diethylaminopropyl 3,4-dichlorobenzoate is the fungicidally-active substance.

9. The method of claim 1 wherein γ-(2,6-dimethylpiperidino)propyl 3,4-dichlorobenzoate is the fungicidally-active substance.

10. A liquid concentrate, suitable for dilution with water to yield a fungicidal spray, said concentrate comprising an inert solid diluent and a wetting agent in admixture with an amount within the range from about 5 to about 40 percent by weight of a fungicidal substance selected from the group consisting of a compound having the following formula and the acid-addition salts thereof:

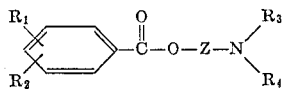

wherein $R_1$ and $R_2$ are halogen; $R_3$ and $R_4$ when taken separately are selected from the group consisting of $C_1$–$C_8$ alkyl and $C_1$–$C_4$ alkenyl; $R_3$ and $R_4$, when taken together with the nitrogen atom to which they are attached, represent a radical selected from the group consisting of morpholino, $C_4$–$C_5$ polymethyleneimino, and lower-alkyl substituted $C_4$–$C_5$ polymethyleneimino; and Z is selected from the group consisting of $C_2$–$C_{10}$ saturated alkylene, $C_2$–$C_{10}$ oxaalkylene, and $C_2$–$C_{10}$ thiaalkylene.

11. A fungicidal composition comprising an inert solid diluent, a wetting agent, and a fungicidal proportion of a substance selected from the group of a compound having the following formula and the acid-addition salts thereof:

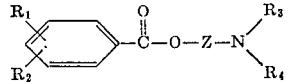

wherein $R_1$ and $R_2$ are halogen; $R_3$ and $R_4$ when taken separately are selected from the group consisting of $C_1$–$C_8$ alkyl and $C_1$–$C_4$ alkenyl; $R_3$ and $R_4$, when taken together with the nitrogen atom to which they are attached, represent a radical selected from the group consisting of morpholino, $C_4$–$C_5$ polymethyleneimino, and lower-alkyl substituted $C_4$–$C_5$ polymethyleneimino; and Z is selected from the group consisting of $C_2$–$C_{10}$ saturated alkylene, $C_2$–$C_{10}$ unsaturated alkylene, $C_2$–$C_{10}$ oxaalkylene, and $C_2$–$C_{10}$ thiaalkylene.

References Cited

UNITED STATES PATENTS

| | | | |
|---|---|---|---|
| 2,358,925 | 9/1944 | Haller et al. | 167—33 |
| 2,454,061 | 11/1948 | Hill et al. | 167—30 |
| 3,025,297 | 3/1962 | Robinson | 260—294.3 |
| 3,175,941 | 3/1965 | Dekker | 167—30 |

ALBERT T. MEYERS, *Primary Examiner.*

GEORGE A. MENTIS, *Assistant Examiner.*

UNITED STATES PATENT OFFICE
CERTIFICATE OF CORRECTION

Patent No. 3,322,618　　　　　　　　　　　　　　May 30, 1967

Harold M. Taylor

It is hereby certified that error appears in the above numbered patent requiring correction and that the said Letters Patent should read as corrected below.

Column 1, lines 46 to 49, the formula should appear as shown below instead of as in the patent:

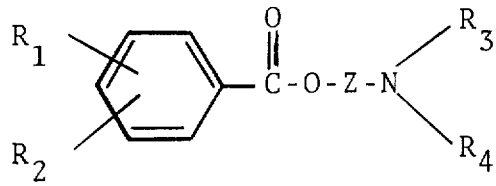

same column 1, line 55, for "$C_2$-$C_{20}$" read -- $C_2$-$C_{10}$ --; column 2, line 44, for "bendoic" read -- benzoic --; column 7, line 66, for "-(2-methylpiperidino)" read -- γ-(2-methylpiperidino) --; column 13, line 6, for "γ-(di-n-butylamino pro-" read -- γ-(di-n-butylamino)pro- --.

Signed and sealed this 25th day of June 1968.

(SEAL)
Attest:

EDWARD M. FLETCHER, JR.　　　　　　　　　EDWARD J. BRENNER
Attesting Officer　　　　　　　　　　　　Commissioner of Patents